(12) United States Patent
Kleba et al.

(10) Patent No.: US 7,972,676 B2
(45) Date of Patent: Jul. 5, 2011

(54) PROCESS FOR THE PRODUCTION OF FIBRE-REINFORCED COMPOSITE PARTS

(75) Inventors: Ingo Kleba, Königswinter (DE); Frank Berghahn, Königswinter (DE); Andreas Petersohn, Hennef (DE); Hans-Guido Wirtz, Leverkusen (DE); Klaus Franken, Bergisch Gladbach (DE); Detlef Mies, Elsdorf (DE); Marc Schütze, Dortmund (DE); Dirk Wegener, Monheim (DE)

(73) Assignee: Bayer MaterialScience AG, Leverkusen (DE)

( * ) Notice: Subject to any disclaimer, the term of this patent is extended or adjusted under 35 U.S.C. 154(b) by 605 days.

(21) Appl. No.: 11/886,619

(22) PCT Filed: Mar. 7, 2006

(86) PCT No.: PCT/EP2006/002053
§ 371 (c)(1),
(2), (4) Date: Jul. 11, 2008

(87) PCT Pub. No.: WO2006/099939
PCT Pub. Date: Sep. 28, 2006

(65) Prior Publication Data
US 2008/0280134 A1    Nov. 13, 2008

(30) Foreign Application Priority Data
Mar. 19, 2005   (DE) .......................... 10 2005 012 796

(51) Int. Cl.
*B32B 3/12* (2006.01)

(52) U.S. Cl. ................. 428/116; 296/210; 296/216.01; 156/242

(58) Field of Classification Search ................. 428/116; 296/210, 216.01; 156/242, 245; 264/275, 264/792
See application file for complete search history.

(56) References Cited

U.S. PATENT DOCUMENTS

| | | | |
|---|---|---|---|
| 4,822,549 A | | 4/1989 | Verwilst et al. |
| 4,925,721 A | * | 5/1990 | Harper-Tervet et al. ...... 428/116 |
| 5,360,885 A | | 11/1994 | Orthmann et al. |
| 6,117,518 A | * | 9/2000 | Cawse et al. .................. 428/116 |
| 7,017,981 B2 | * | 3/2006 | Strohmavr et al. ........... 296/210 |
| 7,524,389 B2 | * | 4/2009 | Elbs et al. ..................... 156/242 |

FOREIGN PATENT DOCUMENTS

| | | |
|---|---|---|
| DE | 3712926 A1 | 11/1988 |
| DE | 10000767 A1 | 7/2001 |
| DE | 10160374 A1 | 6/2003 |
| DE | 10161155 B4 | 8/2007 |

* cited by examiner

*Primary Examiner* — N. Edwards
(74) *Attorney, Agent, or Firm* — Lyndanne M. Whalen; Noland J. Cheung

(57) ABSTRACT

The invention relates to a process for the production of fiber-reinforced composite components in which an outer film is bonded with a layer containing fiber-reinforced polyurethane, characterised in that
a) first an elastic intermediate layer which has a modulus of elasticity of 0.5 MPa to 50 MPa and a thickness of 0.3 mm to 6 mm, is applied to the outer film which has a thickness in the range of 0.2 mm to 5 mm, and then
b) at least one other layer is applied to the back of the intermediate layer, at least one layer containing fiber-reinforced polyurethane being applied.

12 Claims, 3 Drawing Sheets

PROCESS FOR THE PRODUCTION OF FIBRE-REINFORCED COMPOSITE PARTS

The invention relates to a process for the production of composite parts composed of fibre-reinforced plastics with an outer skin composed of a plastic film or thin metal film with a high optical surface quality (also termed class A surface). Glass, plastic, natural or mineral fibres are possible as fibres. Such composite parts can be used e.g. in the automotive industry as roof units, side parts, boot lids and bonnets or other components with high demands on the surface quality.

The problem in producing such composite components with a high surface quality is that materials with a different thermal expansion behaviour are bonded together at elevated temperatures so that inevitably thermal stresses occur in the composite component on cooling.

These thermal stresses occur on the one hand within the support layer as a result of the different shrinkages of the fibres and the surrounding polymer matrix, due to which textures or waves which can be traced to the outside of the outer skin (drawing) can occur within a fibre-reinforced layer on cooling on the surface of the support part. On the other hand, as a result of different shrinkages, the simultaneous bonding of such a fibre-reinforced layer with an outer skin can lead to thermal stresses between the outer skin and the support layer which can cause twisting and detachment of the outer skin from the support layer.

Another problem is that bubbles under the outer skin caused by entrapped air can have a negative effect on the surface optics.

DE-A-10000767 proposes creating a foam core with an open-cell foam structure in the fibre-reinforced layer. The problems on the surface caused by the effect of temperature should thereby be eliminated. The problem can, however, only be solved by this to a very limited extent. The open-cell core layer on the one hand means that the gas in entrapped air on the surface of the film can flow away through the open cell structure. In addition, this measure may mean there is no more shrinkage on cooling of the polyurethane (PU) layer as a result of the gas entrapped in the cells. On the other hand, however, different coefficients of expansion of the support layer and outer skin can still have a negative effect. There is thereby furthermore the danger that there are high stresses in the boundary layer. In addition, there is thereby, particularly with inhomogeneities in the support layer, furthermore the danger of waves forming on the surface which then have a negative effect on the optical appearance of the surface with depressions/elevations of the waves of a few micrometers.

It is furthermore proposed in DE-A-10160374 to use in the reinforced support layer an open-cell polyurethane foam which is compressed in a closed mould by a factor of 5 to 20. These high degrees of compression should improve venting of the mould cavities and consequently lead to a reduction in the entrapped air on the surface of the foam. Here again, however, there are furthermore the same problems as described above. The problem of the different thermal expansion of the support layer and outer skin and the resulting problems, in particular of guaranteeing in the target a class A surface, is not even mentioned in this document.

The problem of thermal stresses is dealt with in a somewhat different connection in DE-A-10161155. There the problem is likewise composite components composed of an outer skin and a layer of fibre-reinforced polyurethane which, however, additionally contain inserts. The problem there is that the insert components have become apparent on the surface of the outer skin on cooling. The solution according to the invention provides a coating of the insert with a polymer layer, the thermal coefficient of expansion being preferably in the range of $+/-30*10^{-6}K^{-1}$ compared to the thermal coefficient of expansion of the surrounding support layer. However, again as a result of this the additional problem of the negative effect of the insert parts is only reduced and the fundamental problem still remains as a result of the different thermal coefficients of expansion of the fibre-reinforced support layer and outer skin.

EP-A-1334878 proposes likewise selecting polyurethane as the material for the outer skin in order to in this way avoid thermal stresses between the outer skin and the support layer. Since the support layer, however, contains glass fibres, this measure again cannot solve the problem. A support layer that contains e.g. glass fibres has overall a completely different thermal coefficient of expansion to a layer that does not contain glass fibres, even if the polymer matrix in the support layer consists of the same material as the outer skin.

One approach for solving the problem lies in a suitable intermediate layer which lies between the support layer and the outer skin. Introducing an intermediate layer with composite components has fundamentally already been known for some time. Thus Offenlegungsschrift DE-A-3712926 describes a composite part in which a layer of PU foam is first applied to the outer skin, a layer of fibres and PU mixture then being applied to this layer. The introduction of an intermediate layer of this type is likewise proposed in applications EP-A-1338496, EP-A-1362770 and EP-A-1459881. EP-A-1338496 proposes open-cell foam or even a flexible, extremely thin coating as alternatives for this barrier layer. The disadvantage of this is that a foam layer can be comparatively easily compressed, as a result of which the outer skin can be locally indented.

EP-A-1362770 alternatively mentions barrier layers in the form of a PU coating (e.g. 0.5 mm thick) as an injection-moulded thermoplastic plastic layer (0.2 to 1 mm thick) or even composed of aluminium foil. The aluminium foil should thereby in particular counteract the so-called bimetal effect which can lead to deformations of composite components on thermal stress as a result of the different coefficients of expansion. Since the coefficient of expansion of the aluminium, however, is very close to that of the support layer and clearly below that of a thermoplastic film, this seems questionable. Just as a thermoplastic plastic layer as a barrier layer actually prevents direct contact of the fibres with the outer skin, a reduction in the mentioned bimetal effect is however at most produced as a result of the slightly increased rigidity.

Consequently, the problem of providing a suitable intermediate layer that reliably meets the requirements posed is so far unsolved. The mentioned intermediate layers seem to be either unsuitable or they are described so imprecisely that it is not possible for the person skilled in the art to produce parts with an optically perfect surface on the basis of the disclosed prior art.

The problems posed with such an intermediate layer should therefore first be described once again in detail:

The object of this intermediate layer is to absorb the stresses resulting from the different expansion behaviours of the outer skin and the support layer so that on the one hand the mechanical strength of the composite and on the other the high optical quality of the outer skin is lastingly retained even with repeated mechanical and thermal stresses.

The intermediate layer must be able to reliably buffer away in particular also any unevenness occurring on the surface of the support layer due to the different shrinkages of the fibres and the polymer matrix.

In addition, the intermediate layer must prevent the composite part bending as a result of the different shrinkage of the outer skin compared to the support layer or forming waves e.g. as a result of the somewhat inhomogeneous distribution of the fibres.

Moreover, the intermediate layer should be able to block surface defects due to entrapped air in the fibre-reinforced support component which become noticeable inter alia with repeated temperature stresses, in order to achieve a good optical appearance.

A further function of the intermediate layer is to e.g. using thermoplastic outer skins avoid surface defects due to inner stresses set in the outer skin which can result e.g. from the production process or subsequent forming processes. Such inner stresses can lead with further processing to the finished composite component, e.g. as a result of elevated temperatures, to the so-called memory effect which causes a local shrinkage. The intermediate layer must consequently be able to absorb the displacements resulting from this so that no wave formation or similar surface defects occur. In this case, lower quality thermoplastic outer skins could also be used.

The object of the present invention is therefore to provide a process for the production of composite parts composed of fibre-reinforced plastics with an outer film (outer skin) composed of a plastic film or thin metal film with a high optical surface quality, in which on the one hand the mechanical strength of the composite and on the other the high optical quality of the outer film is lastingly retained even with repeated mechanical and thermal stresses.

The invention relates to a process for the production of fibre-reinforced composite components in which an outer film is bonded with a layer containing fibre-reinforced polyurethane, characterised in that a) first an elastic intermediate layer which has a modulus of elasticity of 0.5 MPa to 50 MPa and a thickness of 0.3 mm to 6 mm is applied to the outer film which has a thickness in the range of 0.2 mm to 5 mm, and then b) at least one other layer is applied to the back of the intermediate layer, at least one layer containing fibre-reinforced polyurethane being applied.

For example coextruded films with a support layer composed of polycarbonate or ABS (acrylonitrile-butadiene-styrene) and a surface layer composed of PMMA (polymethyl methacrylate) are used as outer films. Monofilms composed of ABS, however, are also possible. The outer film can, however, also consist of a different plastic film or a metal film. The thickness of these films is in the range of 0.2 mm to 5 mm, preferably 0.3 mm to 3 mm and particularly preferably 0.5 mm to 2 mm. They preferably have a modulus of elasticity above 800 MPa, preferably 1000 MPa to 100000 MPa, so that their intrinsic rigidity provides a base stability which counteracts the forces that the intermediate layer can exert due to its elastic deformation. For example films composed of flexible PVC (polyvinylchloride) can be used for internal applications.

The intermediate layer is designed so that the maximum stresses in the boundary layers are so low due to the different changes in length as a result of the thermal shrinkage on cooling and/or the reaction shrinkage and the expansion of entrapped air and the local changes in length in the film due to the memory effect that the intrinsic rigidity of the film prevents waves or other perceptible inhomogeneities being able to occur on the surface. In addition, the stresses are so low that local detachments are not possible either on the interface between outer skin and intermediate layer or on the interface of support layer to intermediate layer. The intermediate layer therefore has a modulus of elasticity of 0.5 MPa to 50 MPa, preferably 1 MPa to 10 MPa and particularly preferably 2 MPa to 5 MPa.

The intermediate layer should in addition not be too thin because otherwise even very elastic materials can no longer sufficiently reduce the stresses. It should, however, also not be too thick because otherwise the hydrostatic reinforcement no longer acts adequately and the entire composite could become too flexible. There is consequently an optimal thickness of the intermediate layer. The intermediate layer therefore has a thickness of 0.3 mm to 6 mm, preferably 1 mm to 4 mm, particularly preferably 1.5 mm to 3 mm.

It is also possible to use a viscoelastic material for the intermediate layer which is able to reduce stresses and thus offers a satisfactory strength to lastingly bond the layers.

When a very elastic intermediate layer is used with the low values described for the modulus of elasticity, there is the danger that with high local stresses the outer film can be markedly indented in places (undesired soft touch effect) or even be overstretched. This danger occurs particularly when the intermediate layer possibly allows a noticeable indentation of the outer film as a result of its compressibility before the rigidity of the intermediate layer can become effective.

It is therefore important that the intermediate layer consists of a material that is as incompressible as possible. Because if the outer film is indented locally, the incompressible intermediate layer has to be displaced, thereby producing an additional hydrostatic rigidity.

This material behaviour is described by the compressive modulus of the intermediate layer which should be preferably between 500 MPa and 5000 MPa, preferably approximately 1000 MPa to 2500 MPa and very particularly preferably approximately 1200 MPa to 2000 MPa.

In order to produce a thin and even intermediate layer, this is applied to the outer film preferably by spraying. It has thereby been shown that the properties of the intermediate layer can have an optimal effect if with spray application there is preferably an even mass distribution with less than +/−10% deviation, particularly preferably less than +/−5% deviation of the mass of the intermediate layer based on surface elements of 5 $cm^2$, i.e. that the weight of the intermediate layer of any surface elements deviates by less than +/−10% or +/−5%.

To improve adhesion between intermediate layer and the at least one other subsequently applied layer, e.g. a support layer or a substrate, it has been shown that it is advantageous to apply the other layer or support layer before the full setting time of the intermediate layer has expired.

The invention also provides for a composite part containing an outer film, an intermediate layer and at least one other layer, at least one of the other layers containing fibre-reinforced polyurethane, characterised in that 1) the outer film has a thickness in the range of 0.2 mm to 5 mm, and 2) the elastic intermediate layer has a modulus of elasticity of 0.5 MPa to 50 MPa and a thickness of 0.3 mm to 6 mm, the elastic intermediate layer containing at least one polyurethane elastomer which is obtainable by reacting a) organic di- and/or polyisocyanates with b) at least one polyether polyol with a number average molecular weight of 800 g/mol to 25,000 g/mol, preferably 800 to 14,000 g/mol, particularly preferably 1000 to 8000 g/mol and with a mean functionality of 2.4 to 8, particularly preferably 2.5 to 3.5, and c) optionally other polyether polyols different from b) with a number average molecular weight of 800 g/mol to 25,000 g/mol, preferably 800 to 14,000 g/mol, particularly preferably 1000 to 8000 g/mol and with mean functionalities of 1.6 to 2.4, preferably 1.8 to 2.4 and d) optionally polymer polyols with contents of 1 to 50 wt. % of fillers based on the polymer polyol and with OH numbers of 10 to 149 and mean functionalities of 1.8 to 8, preferably 1.8 to 3.5, and e) optionally chain extenders with mean functionalities of 1.8 to 2.1, preferably 2, and with molecular weights of 750 g/mol and less, preferably 18 g/mol to 400 g/mol, particularly preferably 60 g/mol to 300 g/mol and/or crosslinking agents with mean functionalities of 3 to 4, preferably 3, and with molecular weights of up to 750 g/mol, preferably 18 g/mol to 400 g/mol, particularly preferably 30 g/mol to 300 g/mol, f) in the presence of amine catalysts and g) metal catalysts and h) optionally additives.

The composite parts according to the invention can be obtained by the process according to the invention.

The polyurethane elastomers (PU elastomers) which are contained in the intermediate layer or of which the intermediate layer consists, are preferably produced in accordance with the prepolymer process wherein suitably in the first step a polyaddition adduct having isocyanate groups is produced from at least a part of polyether polyol b) or mixture thereof with polyol component c) and/or d) and at least one diisocyanate or polyisocyanate a). In the second step, solid PU elastomers can be produced from prepolymers of that type having isocyanate groups by reacting with low-molecular chain extenders and/or crosslinking agents e) and/or the remaining part of polyol component b) and optionally c) and/or d). If in the second step water or other blowing agents or mixtures thereof are used, microcellular PU elastomers can be produced, wherein the compressive module thereof should likewise be between 500 and 5000 MPa.

Aliphatic, cycloaliphatic, araliphatic, aromatic and heterocyclic polyisocyanates such as e.g. are described by W. Siefken in Justus Liebigs Annalen der Chemie, 562, pages 75 to 136, are suitable as starting component a) for the process according to the invention. Examples are those of the formula

Q(NCO)$_n$ in which n=2, 3 or 4, preferably 2 or 3, particularly preferably 2, and Q denotes an aliphatic hydrocarbon radical with 2 to 18, preferably 6 to 10 C atoms, a cycloaliphatic hydrocarbon radical with 4 to 15, preferably 5 to 10 C atoms, an aromatic hydrocarbon radical with 6 to 15, preferably 6 to 13 C atoms, or an araliphatic hydrocarbon radical with 8 to 15, preferably 8 to 13 C atoms. Ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-and -1,4-cyclohexane diisocyanate and any mixtures of these isomers, 1-isocyanato-3,3,5-trimethyl-5-isocyanatomethyl cyclohexane, 2,4- and 2,6-hexahydrotoluylene diisocyanate and any mixtures of these isomers, hexahydro-1,3- and -1,4-phenylene diisocyanate, perhydro-2,4'- and -4,4'-diphenylmethane diisocyanate, 1,3- and 1,4-phenylene diisocyanate, 1,4-durene diisocyanate (DDI), 4,4'-stilbene diisocyanate, 3,3'-dimethyl-4,4'-biphenylene diisocyanate (TODI) 2,4- and 2,6-toluylene diisocyanate (TDI) and any mixtures of these isomers, diphenylmethane-2,4'- and/or -4,4'-diisocyanate (MDI) or naphthylene-1,5-diisocyanate, are preferred.

Furthermore, the following for example are possible: triphenylmethane-4,4',4''-triisocyanate, polyphenyl-polymethylene polyisocyanates, as obtained by condensation of aniline with formaldehyde and subsequent phosgenation and described e.g. in GB-A 874 430 and GB-A 848 671, m- and p-isocyanatophenylsulfonyl isocyanates according to U.S. Pat. No. 3,454,606, perchlorinated aryl polyisocyanates, as described in U.S. Pat. No. 3,277,138, polyisocyanates having carbodiimide groups, as described in U.S. Pat. No. 3,152,162 and in DE-A 25 04 400, DE-A 25 37 685 and DE-A 25 52 350, norbornane diisocyanates according to U.S. Pat. No. 3,492,301, polyisocyanates having allophanate groups, as described in GB-A 994 890, BE-A 761 626 and NL-A 7 102 524, polyisocyanates having isocyanurate groups as described in U.S. Pat. No. 3,001,9731, in DE-A 10 22 789, DE-A 12 22 067 and DE-A 1 027 394 and in DE-A 1 929 034 and DE-A 2 004 048, polyisocyanates having urethane groups, as described e.g. in BE-A 752 261 or in U.S. Pat. No. 3,394,164 and DE-A 3 644 457, polyisocyanates having acylated urea groups according to DE-A 1 230 778, polyisocyanates having biuret groups, as described in U.S. Pat. No. 3,124,605, U.S. Pat. No. 3,201,372 and U.S. Pat. No. 3,124,605 and in GB-A 889 050, polyisocyanates produced by telomerisation reactions, as described in U.S. Pat. No. 3,654,106, polyisocyanates having ester groups, as cited in GB-A 965 474 and GB-A 1 072 956, in U.S. Pat. No. 3,567,763 and in DE-A 12 31 688, reaction products of the above-mentioned isocyanates with acetals according to DE-A 1 072 385 and polyisocyanates containing polymer fatty acid esters according to U.S. Pat. No. 3,455,883

It is also possible to use the distillation residues having isocyanate groups occurring in industrial isocyanate production, optionally dissolved in one or more of the above-named polyisocyanates. It is further possible to use any mixtures of the above-named polyisocyanates.

2,4- and 2,6-toluylene diisocyanate and any mixtures of these isomers ("TDI"), 4,4'-diphenylmethane diisocyanate, 2,4'-diphenylmethane diisocyanate, 2,2'-diphenylmethane diisocyanate and polyphenyl-polymethylene polyisocyanates which are produced by condensation of aniline with formaldehyde and subsequent phosgenation ("crude MDI"), and polyisocyanates having carbodiimide groups, uretonimine groups, urethane groups, allophanate groups, isocyanurate groups, urea groups or biuret groups ("modified polyisocyanates"), in particular such modified polyisocyanates that are derived from 2,4- and/or 2,6-toluylene diisocyanate or from 4,4'- and/or 2,4'-diphenylmethane diisocyanate, are preferably used. Naphthylene-1,5-diisocyanate and mixtures of the polyisocyanates named are also very suitable.

In the process according to the invention, prepolymers having isocyanate groups which are produced by reacting at least a partial quantity of polyol component b) and/or c) and/or chain extender and/or crosslinking agent e) with at least one aromatic diisocyanate from the group TDI, MDI, TODI, DIBDI, NDI, DDI, preferably with 4,4'-MDI and/or 2,4-TDI and/or 1,5-NDI to a polyaddition product having urethane groups and isocyanate groups with an NCO content of 6 to 25 wt. %, preferably 8 to 20 wt. %, are particularly preferably used.

As has already been explained above, mixtures of b), c), d) and e) can be used for the production of prepolymers containing isocyanate groups. According to a preferably used embodiment, the prepolymers containing isocyanate groups but without chain extender or crosslinking agent e) are produced.

Prepolymers having isocyanate groups can be produced in the presence of catalysts. It is also, however, possible to produce the prepolymers having isocyanate groups in the absence of catalysts and add the catalysts to the reaction mixture only after production of the PU elastomers.

Suitable polyether polyols b) or c) for the production of the elastomers according to the invention can be produced according to known processes, for example by polyinsertion by means of DMC catalysis of alkylene oxides, by anionic polymerisation of alkylene oxides in the presence of alkali hydroxides or alkali alcoholates as catalysts and with addition of at least one starter molecule that contains bound 2 to 6, preferably 2 to 4, reactive hydrogen atoms, or by cationic polymerisation of alkylene oxides in the presence of Lewis acids such as antimony pentachloride or boron fluoride etherate. Suitable alkylene oxides contain 2 to 4 carbons atoms in the alkylene radical. Examples are tetrahydrofuran, 1,2-propylene oxide, 1,2- or 2,3-butylene oxide; ethylene oxide and/or 1,2-propylene oxide are preferably used. The alkylene oxides can be used singly, alternately in succession or as mixtures. Mixtures of 1,2-propylene oxide and ethylene oxide are preferably used, the ethylene oxide being used in quantities of 10 to 50% as ethylene oxide end block ("EO cap") so that the resulting polyols have over 70% primary OH end groups. Water or 2- and 3-valent alcohols, such as for example ethylene glycol, 1,2-propanediol and 1,3-propanediol, diethylene glycol, dipropylene glycol, 1,4-ethanediol, glycerol and trimethylolpropane, can be considered as the starter molecule.

Suitable polyether polyols, preferably polyoxypropylene-polyoxyethylene polyols, have mean functionalities of 2.4 to 8, particularly preferably 2.5 to 3.5 (for polyether polyols b)) or mean functionalities of 1.6 to 2.4, preferably 1.8 to 2.4 (for polyether polyols c)) and number average molecular weights of 800 g/mol to 25,000 g/mol, preferably 800 to 14,000 g/mol, particularly preferably 1,000 to 8,000 g/mol (for polyether polyols b) and c)).

Apart from the above-mentioned polyether polyols, polymer-modified polyether polyols, preferably graft polyether polyols, in particular those based on styrene and/or acrylonitrile which are produced by in situ polymerisation of acrylonitrile, styrene or preferably mixtures of styrene and acrylonitrile, e.g. in a ratio by weight of 90:10 to 10:90, preferably 70:30 to 30:70, and polyether polyol dispersions which contain as the disperse phase—usually in quantities of 1 to 50 wt. %, preferably 1 to 45 wt. % based on the polyethers—e.g. inorganic fillers, polyureas (PHD), polyhydrazides, polyurethanes containing bound tert.-amino groups and/or melamine, are suitable as polymer polyols d).

In the production of the elastomers according to the invention, di-and trifunctional polyether polyols with a number average molecular weight of 800 to 25,000, preferably 800 to 14,000 g/mol, particularly preferably 1000 to 8000 g/mol, are preferably used as components b) or c).

In addition, low-molecular difunctional chain extenders, tri- or tetrafunctional crosslinking agents or mixtures of chain extenders and crosslinking agents can be used for the production of the PU elastomers according to the invention.

Chain extenders and crosslinking agents e) of this type are used for modification of the mechanical properties, in particular the hardness, of the PU elastomers. Suitable chain extenders such as alkanediols, dialkylene glycols and polyalkylene polyols and crosslinking agents, such as e.g. 3- or 4-valent alcohols and oligomer polyalkylene polyols with a functionality of 3 to 4, usually have molecular weights of <750 g/mol, preferably 18 to 400 g/mol, particularly preferably 60 to 300 g/mol. Alkanediols with 2 to 12, preferably 2, 4 or 6 carbon atoms, e.g. ethanediol, 1,6-hexanediol, 1,7-heptanediol, 1,8-octanediol, 1,9-nonanediol, 1,10-decanediol and in particular 1,4-butanediol and dialkylene glycols with 4 to 8 carbon atoms, e.g. diethylene glycol and dipropylene glycol and polyoxyalkylene glycols are preferably used as chain extenders. Branched-chain and/or unsaturated alkanediols with usually not more than 12 carbon atoms, such as e.g. 1,2-propanediol, 2-methyl-1,3-propanediol, 2,2-dimethyl-1,3-propanediol, 2-butyl-2-ethyl-1, 3-propanediol, 2-butene-1,4-diol and 2-butyne-1,4-diol, diesters of terephthalic acid with glycols with 2 to 4 carbon atoms, such as e.g. terephthalic acid-bis-ethylene glycol or terephthalic acid-bis-1,4-butanediol, hydroxyalkylene ethers of hydroquinone or resorcinol, e.g. 1,4-di-(β-hydroxyethyl)-hydroquinone or 1,3-(β-hydroxyethyl)-resorcinol, alkanolamines with 2 to 12 carbon atoms such as ethanolamine, 2-aminopropanol and 3-amino-2,2-dimethylpropanol, N-alkyldialkanolamines, e.g. N-methyl- and N-ethyl diethanolamine, (cyclo)aliphatic diamines with 2 to 15 carbon atoms, such as e.g. 1,2-ethylenediamine, 1,3-propylenediamine, 1,4-butylenediamine and 1,6-hexamethylenediamine, isophoronediamine, 1,4-cyclohexamethylenediamine and 4,4'-diaminodicyclohexylmethane, N-alkyl-, N,N'-dialkyl-substituted and aromatic diamines which can also be substituted on the aromatic radical by alkyl groups, with 1 to 20, preferably 1 to 4 carbon atoms in the N-alkyl radical, such as N,N'-diethyl-, N,N'-di-sec.-pentyl-, N,N'-di-sec.-hexyl-, N,N'-di-sec.-decyl- and N,N'-dicyclohexyl-, (p- or m-)-phenylene diamine, N,N'-dimethyl-, N,N'-diethyl-, N,N'-diisopropyl-, N,N'-di-sec.-butyl-, N,N'-dicyclohexyl-, 4,4'-di-amino-diphenylmethane, N,N'-di-sec.-butylbenzidine, methylene-bis(4-amino-3-benzoic acid methyl ester), 2,4-chloro-4,4'-diamino-diphenylmethane, 2,4- and 2,6-toluylene diamine, are also suitable.

The compounds of component e) can be used in the form of mixtures or singly. Mixtures of chain extenders and crosslinking agents can also be used.

Structural components b), c), d) and e) can be varied in relatively broad quantity ratios to adjust the hardness of the PU elastomer, the hardness rising as the content of component e) in the reaction mixture increases.

The required quantities of structural components b), c), d) and e) can be experimentally determined in a simply way to obtain a desired hardness of the PU elastomers. 1 to 50 parts by weight, preferably 2.5 to 20 parts by weight, of the chain extender and/or crosslinking agent e), based on 100 parts by weight of the higher-molecular compounds b), c) and d), are more advantageously used.

Amine catalysts familiar to the person skilled in the art, e.g. tertiary amines such as triethylamine, tributylamine, N-methyl morpholine, N-ethyl morpholine, N,N,N',N'-tetramethyl ethylenediamine, pentamethyl diethylene triamine and higher homologs (DE-A 26 24 527 and DE-A 26 24 528), 1,4-diazabicyclo-[2,2,2]-octane, N-methyl-N'-dimethylaminoethyl piperazine, bis-(dimethylaminoalkyl) piperazine, N,N'-dimethylbenzylamine, N,N-dimethylcyclohexylamine, N,N-diethylbenzylamine, bis-(N,N-diethylaminoethyl) adipate, N,N,N',N'-tetramethyl-1,3-butane diamine, N,N-dimethyl-B-phenyl-ethylamine, bis-(dimethylaminopropyl) urea, bis-(dimethylaminopropyl) amine, 1,2-dimethylimidazole, 2-methylimidazole, monocyclic and bicyclic amidines, bis-(dialkylamino)-alkylethers, such as e.g. bis(dimethylaminoethyl) ethers, and tertiary amines having amide groups (preferably formamide groups) according to DE-A 25 23 633 and DE-A 27 32 292), can be used as component f). Known Mannich bases composed of secondary amines, such as dimethylamine and aldehydes, preferably formaldehyde, or ketones such as acetone, methylethylketone or cyclohexanone and phenols, such as phenol, nonylphenol or bisphenol, are also suitable as catalysts. Tertiary amines having hydrogen atoms active in relation to isocyanate groups as catalyst are e.g. triethanolamine, triisopropanolamine, N-methyldiethanolamine, N-ethyldiethanolamine, N,N-dimethyl ethanolamine, the reaction products thereof with alkylene oxides such as propylene oxide and/or ethylene oxide and secondary-tertiary amines according to DE-A 27 32 292. Furthermore, amines with carbon-silicon bonds such as described in U.S. Pat. No. 3,620,984, e.g. 2,2,4-trimethyl-2-silamorpholine and 1,3-diethylaminomethyl tetramethyl disiloxane, can be used as catalysts. Furthermore, nitrogen-containing bases such as tetraalkylammonium hydroxides, furthermore hexahydrotriazines, are also considered. The reaction between NCO groups and Zerewitinoff-active hydrogen atoms is greatly accelerated by lactams and azalactams.

According to the invention, as metal catalyst g) organic metal compounds of tin, titanium, bismuth, in particular organic tin compounds, can also be used, as additional catalysts. In addition to sulfur-containing compounds, such as di-n-octyl tin mercaptide, preferably tin(II) salts of carboxylic acids, such as tin(II) acetate, tin(II) octoate, tin(II) ethyl hexoate, tin(II) laurate and tin(IV) compounds, e.g. dibutyl tin oxide, dibutyl tin dichloride, dibutyl tin diacetate, dibutyl tin dilaurate, dibutyl tin maleate or dioctyl tin diacetate, are considered as organic tin compounds.

The reaction mixture for the production of compact and cellular PU elastomers can optionally be provided with additives h). Surface-active additives such as emulsifiers, foam stabilisers, cell regulators, flame retardants, nucleating agents, oxidation retarders, stabilisers, lubricants and mould release agents, colorants, dispersing agents and pigments for example can be named. For example the sodium salts of castor oil sulfonates or salts of fatty acids with amines such as oleic acid diethylamine or stearic acid diethanolamine are possible as emulsifiers. Alkali or ammonium salts of sulfonic acids such as for example of dodecyl benzenesulfonic acid or dinaphtyl methane disulfonic acid or of fatty acids such as ricinoleic acid or of polymer fatty acids can also be used as surface-active additives. Predominantly polyether siloxanes, especially water-soluble agents, are possible as foam stabilisers. These compounds are in general structured so that a copolymer composed of ethylene oxide and propylene oxide is bonded with a polydimethyl siloxane radical. Foam stabilisers of this type are described e.g. in U.S. Pat. No. 2,834,748, U.S. Pat. No. 2,917,480 and U.S. Pat. No. 3,629,308. Of particular interest are polysiloxane-polyoxyalkylene copolymers branched by means of allophanate groups according to DE-A 25 58 523. Other organopolysiloxanes, oxyethylated alkylphenols, oxyethylated fatty alcohols, paraffin oils, castor oil or ricinoleic acid esters, Turkey-red oil, peanut oil and cell regulators such as paraffins, fatty alcohols and polydimethyl siloxanes are also suitable. Furthermore, oligomer polyacrylates with polyoxyalkylene and fluoroalkane radicals as side groups are suitable for improving the emulsifying effect, the dispersion of the filler, the cell structure and/or the stabilisation thereof. The surface-active substances are usually used in quantities of 0.01 to 5 parts by weight based on 100 parts by weight of higher-molecular polyhydroxyl compounds b) and c). Reaction retarders, furthermore pigments or colorants and known flame retardants, furthermore stabilisers against ageing and weathering effects, plasticisers and substances with a fungistatic and bacteriostatic effect can also be used.

Other examples of surface-active additives and foam stabilisers optionally to be used, and cell regulators, reaction retarders, stabilisers, flame-retardant substances, plasticisers, colorants and fillers, and fungstatically and bacteriostatically active substances, and details on the method of use and action of these additives are described in R. Vieweg, A. Höchtlen (prod.): "Kunststoff-Handbuch", volume VII, Carl-Hanser-Verlag, Munich, 3$^{rd}$ edition, 1993, pp 118 to 124.

The invention is explained in the following in greater detail for illustration by means of FIGS. 1a to 1f and 2 and 3.

Figure 1A:
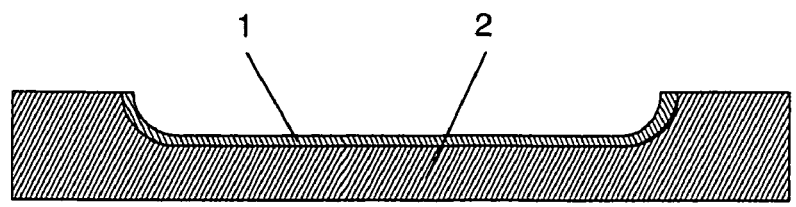
FIGS. 1a to 1f show the essential process steps.
Figure 1B:
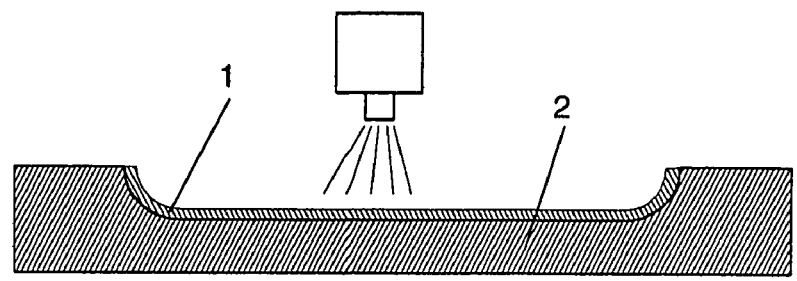
Figure 1C:
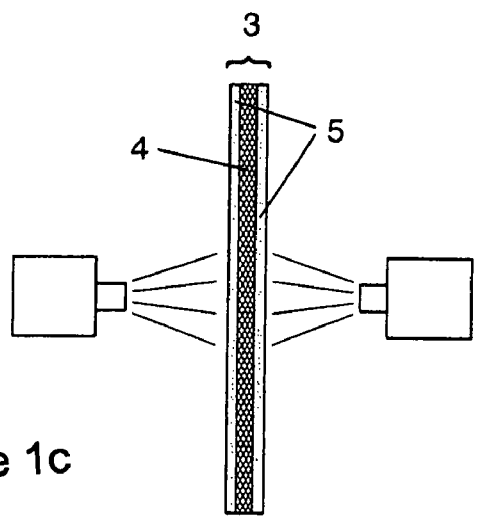
Figure 1D:
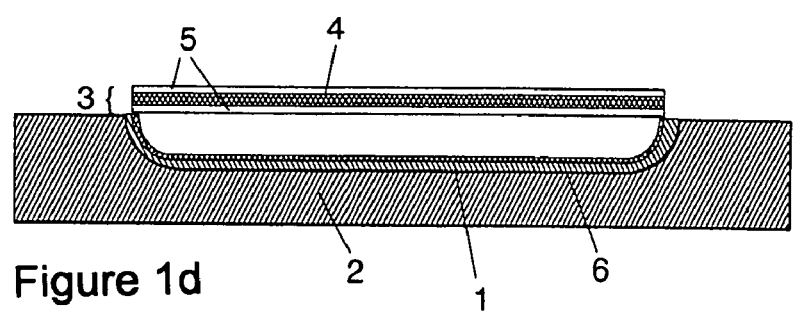
Figure 1E:
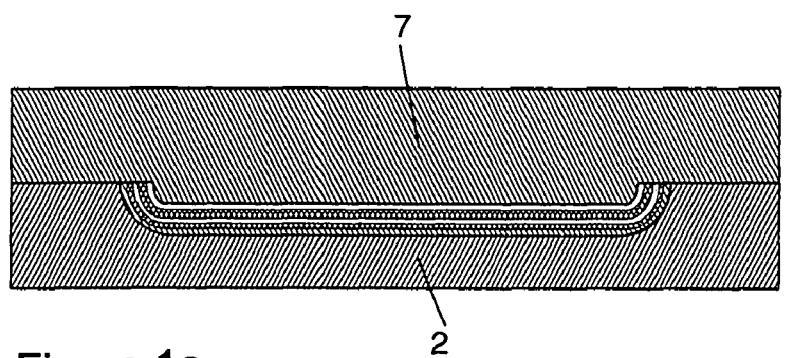
Figure 1F:
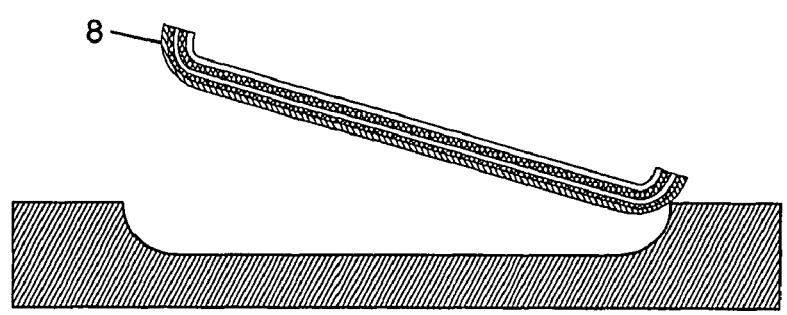

In FIG. 1a, the coating film or outer film 1 is inserted in the bottom mould 2 and aspirated with vacuum (not shown). The intermediate layer is then applied by spraying, as shown in FIG. 1b. Parallel to this or slightly staggered timewise, the support layer can then be prepared. FIG. 1c shows by way of example a support layer 3 with a honeycomb core 4 which is coated on both sides with glass fibre mats 5 which have been or are sprayed with polyurethane binder. The polyurethane binder provides on the one hand bonding of the glass fibre mats with the honeycomb core 4 and on the other bonding with the intermediate layer 6 which is shown in FIG. 1d. The support layer 3 is then placed on the intermediate layer 6 bonded with the outer film 1 in the mould 2, as shown in FIG. 1d. The mould cavity is then closed with the top mould 7 (FIG. 1e) using which on the one hand shaping of the support layer 3 and bonding of the support layer 3 with the intermediate layer 6 is achieved. After curing, the moulded part 8 can then be removed, as shown in FIG. 1f.

Figure 2:
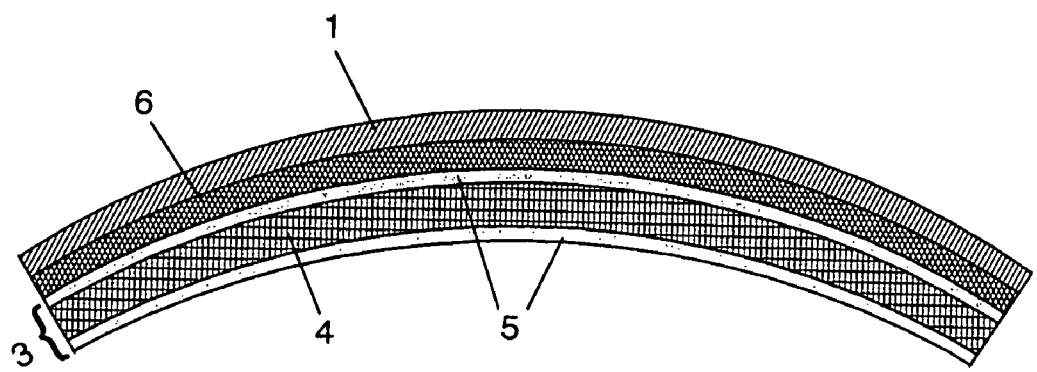
FIGS. 2 and 3 show by way of example two composite parts with a different structure.

FIG. 2 shows the structure of such a composite part 8 taken from the mould and rotated 180°, the production of which is shown in FIGS. 1a to 1f. The outer film 1 forms the outer visible termination of the composite part. Behind this is the intermediate layer 6 and under this in turn is the support layer 3 which consists of a honeycomb core 4 which is surrounded on both sides with glass fibre mats 5 impregnated with polyurethane binder.

Figure 3:
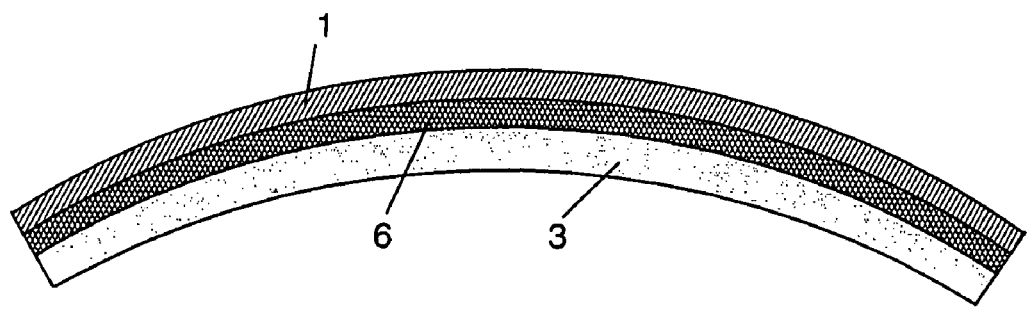

FIG. 3 shows an alternative structure of a composite part 8 in which the support layer 3 consists only of a glass fibre-reinforced polyurethane matrix without a honeycomb core. This can in turn be a glass fibre mat impregnated with polyurethane or chopped strands which are not added until the polyurethane mixture is applied. The composite part likewise in turn has an outer film 1 and an intermediate layer 6 arranged between the outer film 1 and the support layer 3.

The invention claimed is:

1. A process for the production of fibre-reinforced composite components in which an outer film is bonded with a layer containing fibre-reinforced polyurethane comprising:
   a) applying an elastic intermediate layer which has a modulus of elasticity of from 0.5 MPa to 50 MPa and a thickness of 0.3 mm to 6 mm to the outer film which has a thickness in the range of 0.2 mm to 5 mm, and
   b) applying at least one other layer to the intermediate layer's surface which is not in contact with the outer layer, provided that at least one layer containing fibre-reinforced polyurethane is applied.

2. The process of claim 1 in which the intermediate layer has a compressive modulus of between 500 MPa and 5000 MPa.

3. The process of claim 2 in which the intermediate layer contains a polyurethane elastomer.

4. The process of claim 1 in which the intermediate layer contains a polyurethane elastomer.

5. The process of claim 3 in which the intermediate layer has viscoelastic properties.

6. The process of claim 1 in which the intermediate layer has viscoelastic properties.

7. The process of claim 2 in which application of the at least one other layer takes place before complete setting of the intermediate layer.

8. The process of claim 4 in which application of the at least one other layer takes place before complete setting of the intermediate layer.

9. The process of claim 6 in which application of the at least one other layer takes place before complete setting of the intermediate layer.

10. The process of claim 1 in which the intermediate layer is applied by spraying.

11. The process of claim 10 in which the spray application is carried out with an even mass distribution with less than +/−10% deviation of the mass of the intermediate layer based on surface elements of 5 cm$^2$.

12. A composite comprising an outer film, an intermediate layer and at least one other layer, with at least one of the other layers containing fibre-reinforced polyurethane in which
  a) the outer film has a thickness in the range of 0.2 mm to 5 mm, and
  b) the elastic intermediate layer has a modulus of elasticity of 0.5 MPa to 50 MPa and a thickness of 0.3 mm to 6 mm, the elastic intermediate layer containing at least one polyurethane elastomer which is produced by reacting
    (i) an organic di- and/or polyisocyanate with
    (ii) at least one polyether polyol with a number average molecular weight of 800 g/mol to 25,000 g/mol and with a mean functionality of 2.4 to 8, and
    (iii) optionally, at least one polyether polyol different from (ii) with a number average molecular weight of from 800 g/mol to 25,000 g/mol and a mean functionality of from 1.6 to 2.4, and
    (iv) optionally, a polymer polyol with from 1 to 50 wt. % filler content, based on the polymer polyol and with an OH value of from 10 to 149 and a mean functionality of from 1.8 to 8, and
    (v) optionally, a chain extender with a mean functionality of from 1.8 to 2.1, and a molecular weight no greater than 750 g/mol, and/or a crosslinking agent with a mean functionality of from 3 to 4 and a molecular weight of up to 750 g/mol, in the presence of
    (vi) an amine catalyst and
    (vii) a metal catalyst and
    (viii) optionally, additives.

* * * * *